United States Patent [19]

Ziaylek

[11] Patent Number: 5,465,814
[45] Date of Patent: Nov. 14, 1995

[54] COLLAPSIBLE WHEEL CHOCK APPARATUS

[75] Inventor: Michael P. Ziaylek, 15 Cold Spring Ave., Yardley, Pa. 19067

[73] Assignees: Theodore Ziaylek, Jr.; Michael P. Ziaylek, both of Yardley, Pa.

[21] Appl. No.: 322,671

[22] Filed: Oct. 13, 1994

[51] Int. Cl.$^6$ ...................................................... B60T 3/00
[52] U.S. Cl. .................. 188/32; 188/4 R; 410/30
[58] Field of Search ............................ 188/32, 4 R, 2 R; 410/8, 9, 10, 19, 20, 21, 29, 30, 49, 50; D12/217

[56] References Cited

U.S. PATENT DOCUMENTS

| | | |
|---|---|---|
| 1,035,381 | 8/1912 | Moss . |
| 1,746,415 | 2/1930 | Burkart ..................... 188/32 |
| 1,768,265 | 6/1930 | Nicholls . |
| 1,894,439 | 1/1933 | Chisholm . |
| 2,184,487 | 12/1939 | Clark . |
| 2,240,512 | 5/1941 | Morgensen, Jr. ............ 188/32 |
| 2,585,370 | 2/1952 | Cless . |
| 2,666,502 | 1/1954 | Fee . |
| 2,671,533 | 3/1954 | Taylor . |
| 2,723,005 | 11/1955 | Wink . |
| 2,816,627 | 12/1957 | Wilson et al. .............. 188/32 |
| 2,818,940 | 1/1958 | Boyle . |
| 2,822,063 | 2/1958 | Hampton . |
| 2,822,890 | 2/1958 | Kriewaldt . |
| 2,829,738 | 4/1958 | Vasquez . |
| 2,903,094 | 9/1959 | Andersen ................. 188/32 |
| 3,068,962 | 12/1962 | Petro . |
| 3,317,007 | 5/1967 | Braun . |
| 3,353,633 | 11/1967 | Leonard et al. . |
| 3,387,686 | 6/1968 | Little . |
| 3,647,029 | 3/1972 | Hanley . |
| 3,845,845 | 11/1974 | Geisthoff . |
| 3,973,651 | 8/1976 | Garrett et al. . |
| 4,109,763 | 8/1978 | Sugino . |
| 4,140,206 | 2/1979 | Yamazaki et al. . |
| 4,421,210 | 12/1983 | Sugino . |
| 4,911,270 | 3/1990 | Hudson . |
| 4,917,219 | 4/1990 | Henry . |
| 5,104,170 | 4/1992 | Rich . |
| 5,137,121 | 8/1992 | Leonard . |
| 5,294,221 | 3/1994 | Eller et al. . |
| 5,302,063 | 4/1994 | Winsor . |

Primary Examiner—Robert J. Oberleitner
Assistant Examiner—Kevin D. Rutherford
Attorney, Agent, or Firm—Sperry, Zoda & Kane

[57] ABSTRACT

A collapsible wheel chock apparatus having a main body member with a preferably concave wheel engaging surface and a swing arm member pivotally secured to the main body member which includes a locking slot located therein with preferably a locking tab extending into the slot. A cross bar member is pivotally secured to the main body member and is movably secured and retained within the slot defined in the swing arm member. The cross bar member is adapted to be locked adjacent one end of the locking slot by a spring bias locking mechanism to facilitate holding of the wheel chock in the raised position for abutment against a vehicle wheel. The cross bar member is movable to the opposite end of the locking slot to allow the swing arm member and cross bar member both to be collapsed against the main body member for storage in this collapsed position. Engagement between the cross bar member and the swing arm member can be enhanced by the inclusion of a tab extending into the slot defined in the swing arm member and this tab or block is adapted to engage a complementary shaped slot defined in the cross bar member.

20 Claims, 5 Drawing Sheets

COLLAPSIBLE WHEEL CHOCK APPARATUS

BACKGROUND OF THE INVENTION

1. Field of the Invention

The present invention deals with the field of devices adapted to be wedged between a vehicle and a surface upon which the wheel is riding for providing an external means for fixing a vehicle in place on a highway and preventing rolling or other movement thereof. Such devices are conventionally available in the form of blocks or wedges which are often stored on the vehicle itself. The present design is specifically used for emergency vehicles which have larger wheels and require a heavy duty wheel chocking apparatus. Also with such emergency vehicles storage is a distinct problem. As such, the present invention provides a heavy duty wheel chocking or blocking device which is collapsible for storage in the minimal amount of space possible upon the emergency vehicle. Such emergency vehicles often have significant storage problems due to the many different types of equipment such vehicles must hold. The present invention provides the heavy duty wheel chocking apparatus while taking up only a minimal amount of space in the emergency equipment storage area of such a vehicle.

2. Description of the Prior

Many prior art devices have been utilized for wheel blocking and some have been configured which are collapsible such as shown in U.S. Pat. No. 1,035,381 patented Aug. 13, 1912 to T. J. Moss on a "Chock"; and U.S. Pat. No. 1,746,415 patented Feb. 11, 1930 to J. A. Burkart on a "Collapsible Wheel Chuck"; and U.S. Pat. No. 1,768,265 patented Jun. 24, 1930 to F. T. Nicholls on a "Collapsible Chock For Road Vehicle Wheels"; and U.S. Pat. No. 1,894,439 patented Jan. 17, 1933 to G. F. Chisholm on an "Adjustable And Collapsible Wheel Chock"; and U.S. Pat. No. 2,184,487 patented Dec. 26, 1939 to J. W. Clark on a "Folding Chock"; and U.S. Pat. No. 2,240,512 patented May 6, 1941 to O Morgensen, Jr. on a "Wheel Chock"; and U.S. Pat. No. 2,585,370 patented Feb. 12, 1952 to J. M. Cless on a "Folding Wheel Chock"; and U.S. Pat. No. 2,666,502 patented Jan. 19, 1954 to E. L. Fee on a "Wheel Chock"; and U.S. Pat. No. 2,671,533 patented Mar. 9, 1954 to B. L. Taylor on a "Self-Resetting Chock"; and U.S. Pat. No. 2,723,005 patented Nov. 8, 1955 to A. B. Wink on "Wheel Chocks"; and U.S. Pat. No. 2,816,627 patented Dec. 17, 1957 to M. C. Wilson et al and assigned to Calumet Steel Castings Corporation on a "Retractable Wheel Chock"; and U.S. Pat. No. 2,818,940 patented Jan. 7, 1958 to L. J. Boyle on a "Chock"; and U.S. Pat. No. 2,822,063 patented Feb. 4, 1958 to W. E. Hampton and assigned to United Equipment & Service Inc. on a "Self Adjusting Chock"; and U.S. Pat. No. 2,822,890 patented Feb. 11, 1958 to A. A. Kriewaldt on a "Chock Brake"; and U.S. Pat. No. 2,829,738 patented Apr. 8, 1958 to J. C. Vasquez on a "Collapsible Chock"; and U.S. Pat. No. 2,903,094 patented Sep. 8, 1959 to F. H. Andersen on a "Collapsible Wheel Block"; and U.S. Pat. No. 3,068,962 patented Dec. 18, 1962 to J. M. Petro on a "Collapsible Wheel Chock"; and U.S. Pat. No. 3,317,007 patented May 2, 1967 to R. C. Braun on a "Continual-Self-Adjsuting Wheel Chock Unit"; and U.S. Pat. No. 3,353,633 patented Nov. 21, 1967 to L. Leonard et al on a "Chock Device For Wheels"; and U.S. Pat. No. 3,387,686 patented Jun. 11, 1968 to F. H. Little on a "Wheel Chock"; and U.S. Pat. No. 3,647,029 patented Mar. 7, 1972 to J. Hanley on a "Wheel Chock"; and U.S. Pat. No. 3,845,845 patented Nov. 5, 1974 to H. Geisthoff and assigned to Jean Walterscheid GmbH on "Wheel Chock For Vehicles"; and U.S. Pat. No. 3,973,651 patented Aug. 10, 1976 to K. Garrett et al and assigned to Humphrey Thompson Enterprises Limited on a "Vehicle Chock"; and U.S. Pat. No. 4,109,763 patented Aug. 29, 1978 to T. Sugino on a "Wheel Stop Apparatus"; and U.S. Pat. No. 4,140,206 patented Feb. 20, 1979 to S. Yamazaki et al and assigned to Aisin Seiki Kabushiki Kaisha on a "Collapsible Wheel Chock"; and U.S. Pat. No. 4,421,210 patented Dec. 20, 1983 to Y. Sugino and assigned to Sugino Press Co., Ltd. on a "Wheel Stop Apparatus"; and U.S. Pat. No. 4,911,270 patented Mar. 27, 1990 to T. Hudson on a "Chock For Wheeled Vehicle"; and U.S. Pat. No. 4,917,219 patented Apr. 17, 1990 to S. Henry on a "Wheel Chock"; and U.S. Pat. No. 5,104,170 patented Apr. 14, 1992 to J. Rich and assigned to Jackson Assembly Enterprises, Inc. on an "Automobile Jack And Wheel Chock System"; and U.S. Pat. No. 5,137,121 patented Aug. 11, 1992 to P. Leonard on a "Trailer Wheel Chock"; and U.S. Pat. No. 5,294,221 patented Mar. 15, 1994 to D. Eller et al on an "Adjustable Vehicle Wheel Restraint"; and U.S. Pat. No. 5,302,063 patented Apr. 12, 1994 to R. Winsor and assigned to Holden America Inc. on a "Vehicle Wheel Chock".

SUMMARY OF THE INVENTION

The present invention provides a collapsible wheel chock apparatus which is designed to be positioned upon a street, roadway, ground, or other vehicle support surface for wedging between a vehicle wheel and the surface for restricting movement of the vehicle. Originally such designs solely included simple blocks positioned behind each wheel of a vehicle to restrict movement thereof. The present design is particularly for use with emergency vehicles which normally include rather large trucks which thereby requires a rather heavy duty wheel chock usable with wheels of large diameter.

The wheel chock of the present invention is also designed to be collapsible for minimizing the storage space required on vehicles such as emergency vehicles requiring use of such wheel chocks.

The collapsible wheel chock apparatus of the present invention includes a main body member adapted to be positioned upon a vehicle support surface in abutment with the vehicle wheel for restricting movement thereof. The main body member preferably includes a first main body end positioned in abutment with the vehicle support surface for supporting the raised collapsible vehicle wheel chock apparatus. The main body member also includes a second main body end spatially disposed along the main body member from the first main body end and extending outwardly therefrom. A wheel engagement surface is defined on the main body between the first main body end and the second main body end for facilitating abutment against the vehicle wheel.

To facilitate engagement between the first main body end and the surrounding vehicle support surface or ground area a primary gripping means may be defined thereon. This primary gripping means may take the form of a plurality of primary engagement teeth facilitating engagement with various different types of vehicle support surfaces such as asphalt, concrete, earth, grass or other surfaces.

Furthermore to facilitate movement of the collapsible wheel chock apparatus of the present invention the main body member may define a handle opening therein to facilitate handling or lifting of the unit as desired. This handle opening preferably can be defined directly in the upper portion of the wheel engagement surface to further facilitate handling of the wheel chock apparatus of the present invention.

The collapsible wheel chock apparatus of the present invention further includes a swing arm member pivotally secured to the second main body end of the main body member. This swing arm member preferably includes a first swing arm end adapted to directly engage the adjacent ground surface for facilitating support of the collapsible wheel chock apparatus in wedged position between the vehicle support surface and the vehicle wheel. This first swing arm end will preferably include a secondary surface gripping device defined thereon to facilitate engagement with the vehicle support surface in abutment therewith. The secondary surface gripping device may include a plurality of secondary engagement teeth to further facilitate gripping with respect to various different configurations of the vehicle support surface such as concrete, asphalt, earth, grass or other surfaces. The swing arm member preferably includes a second swing arm end spatially disposed from the first swing arm end along the member itself and pivotally secured with respect to the second main body end of the main body member. The swing arm member preferably will also define a locking slot therein including a first locking slot end and a second locking slot end. A locking tab will be positioned on the swing arm member such as to extend into the locking slot adjacent to the second locking slot end.

A cross bar member is preferably pivotally secured with respect to the main body member and is movably secured with respect to the swing arm extending through the locking slot of the swing arm member. This cross bar member preferably includes a first cross bar end pivotally secured with respect to the main body at an intermediate position thereon between the first main body end and the second main body end. This intermediate position will allow pivotal movement of the cross bar member with respect to the entire main body member.

A second cross bar end is Spatially disposed from the first cross bar end on the cross bar member and is movably secured with respect to the swing arm within the confinement of the locking slot. A central cross bar strut will extend from the first cross bar end through the locking slot to the second cross bar end. This cross bar strut is movable within the locking slot between the collapsed position adjacent the first locking slot end and the raised position adjacent the second locking slot end. The central cross bar strut is selectively engageable with respect to the swing arm member adjacent the second locking slot end for selectively locking thereof in the raised position. The central cross bar strut defines a tab engagement opening therein which is adapted to receive the locking tab extending therein to allow detachable securement of the cross bar member with respect to the swing arm member to facilitate selective retaining of the central cross bar strut and the cross bar member in the raised position to thereby facilitate engaging of a vehicle wheel by the vehicle wheel engagement surface of the main body member in a stabilized configuration.

A shoulder configuration may be positioned adjacent the second cross bar end means to extend laterally outwardly therefrom to movably retain the cross bar member extending through the locking slot defined in the swing arm member and allow movement of the cross bar member within the locking slot.

A disengageable locking mechanism will be included for selectively retaining the central cross bar strut and the cross bar member in the raised position to facilitate engagement of a vehicle wheel by the wheel engagement surface of the main body. The disengageable locking mechanism will preferably be resiliently biased into a position of engagement with the cross bar member with respect to the swing arm member. The disengageable locking mechanism will preferably include a spring biasing device for retaining engagement of the swing arm member with respect to the cross bar member. This disengageable locking mechanism will further include a release tab to facilitate engagement of the locking mechanism for allowing of movable engagement between the cross bar member and the swing arm member. This swing arm member will be pivotable with respect to the main body member to a collapsed position thereagainst with the second main body end immediately adjacent thereto responsive to the central cross bar strut being in the collapsed position adjacent the first locking slot end.

With this configuration the central cross bar strut can be positioned adjacent the second end of the locking slot such that the tab engagement opening therein engages with the locking tab of the swing arm member. With these members engaged the disengageable locking mechanism is adapted to maintain positive engagement between the swing arm member and the cross bar member. With these two members so engaged a triangular configuration is erected with the main body member extending upwardly and angularly with the concave wheel engagement surface thereof adapted to receive a vehicle wheel wedged thereagainst. For release, the disengageable locking mechanism is released preferably by pressing on the release tab. In this manner the spring biasing means will disengage the cross bar member from the swing arm member in such a manner as to allow the locking tab to be removed from the tab engagement opening. With this movement the central cross bar strut of the cross bar member will move from the second locking slot end toward the first locking slot end of the locking slot. When the central cross bar strut reaches the first locking slot end the swing arm member will be free to collapse into a position extending along the main body member and the cross bar member will also be able to collapse adjacent the main body member thereby achieving the collapsed position for storage of the unit.

It is an object of the present invention to provide a collapsible wheel chock apparatus positioned upon a vehicle support surface in abutment against the vehicle wheel for restricting movement thereof which has a minimum number of moving parts.

It is an object of the present invention to provide a collapsible wheel chock apparatus positioned upon a vehicle support surface in abutment against the vehicle wheel for restricting movement thereof which requires a minimal initial capital cost outlay.

It is an object of the present invention to provide a collapsible wheel chock apparatus positioned upon a vehicle support surface in abutment against the vehicle wheel for restricting movement thereof which has very low maintenance requirements.

It is an object of the present invention to provide a collapsible wheel chock apparatus positioned upon a vehicle support surface inabutment against the vehicle wheel for restricting movement thereof which is usable with the largest diameter vehicle and truck wheels.

It is an object of the present invention to provide a collapsible wheel chock apparatus positioned upon a vehicle support surface in abutment against the vehicle wheel for restricting movement thereof which achieves firm interlocking for effective support of a vehicle wheel.

It is an object of the present invention to provide a collapsible wheel chock apparatus positioned upon a vehicle support surface in abutment against the vehicle wheel for restricting movement thereof which is heavy duty for resisting movement of wheels on very heavy vehicles.

It is an object of the present invention to provide a collapsible wheel chock apparatus positioned upon a vehicle support surface in abutment against the vehicle wheel for restricting movement thereof which is easily handled by a handle opening positioned in the concave wheel support surface.

It is an object of the present invention to provide a collapsible wheel chock apparatus positioned upon a vehicle support surface in abutment against the vehicle wheel for restricting movement thereof which includes teeth on the ground engaging portion to facilitate engagement with the environmental ground surface.

It is an object of the present invention to provide a collapsible wheel chock apparatus positioned upon a vehicle support surface in abutment against the vehicle wheel for restricting movement thereof which is easy to collapse for storage.

It is an object of the present invention to provide a collapsible wheel chock apparatus positioned upon a vehicle support surface in abutment against the vehicle wheel for restricting movement thereof which can be stored within areas of six inches or less in height.

It is an object of the present invention to provide a collapsible wheel chock apparatus positioned upon a vehicle support surface in abutment against the vehicle wheel for restricting movement thereof which achieves significant structural strength due to the triangular configuration of the three main structural parts movably secured with respect to one another.

It is an object of the present invention to provide a collapsible wheel chock apparatus positioned upon a vehicle support surface in abutment against the vehicle wheel for restricting movement thereof which includes a spring biased locking mechanism for securing the wheel chock in the raised position.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
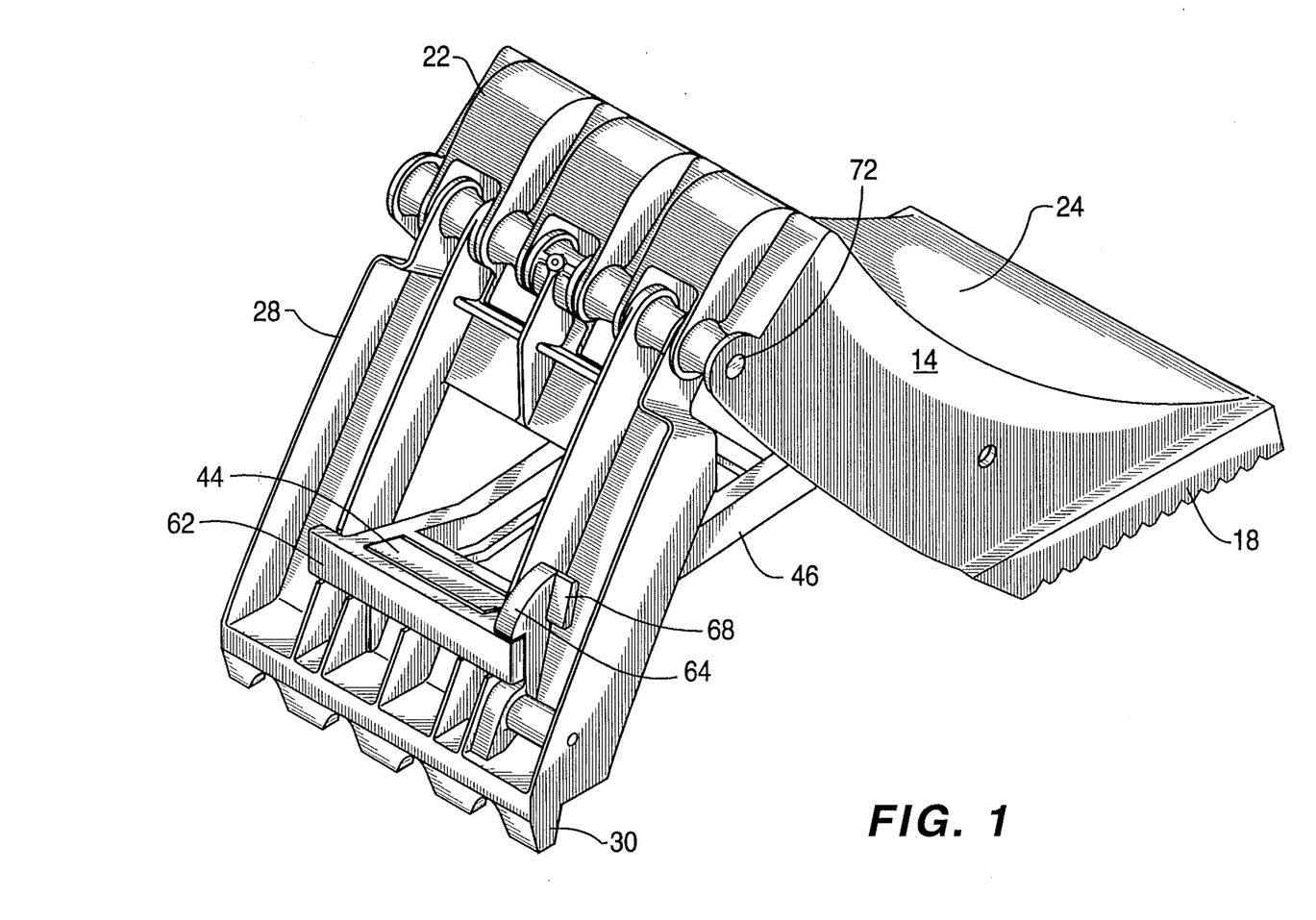
FIG. 1 is a perspective view of an embodiment of the collapsible wheel chock apparatus of the present invention shown in the raised position.
Figure 2:
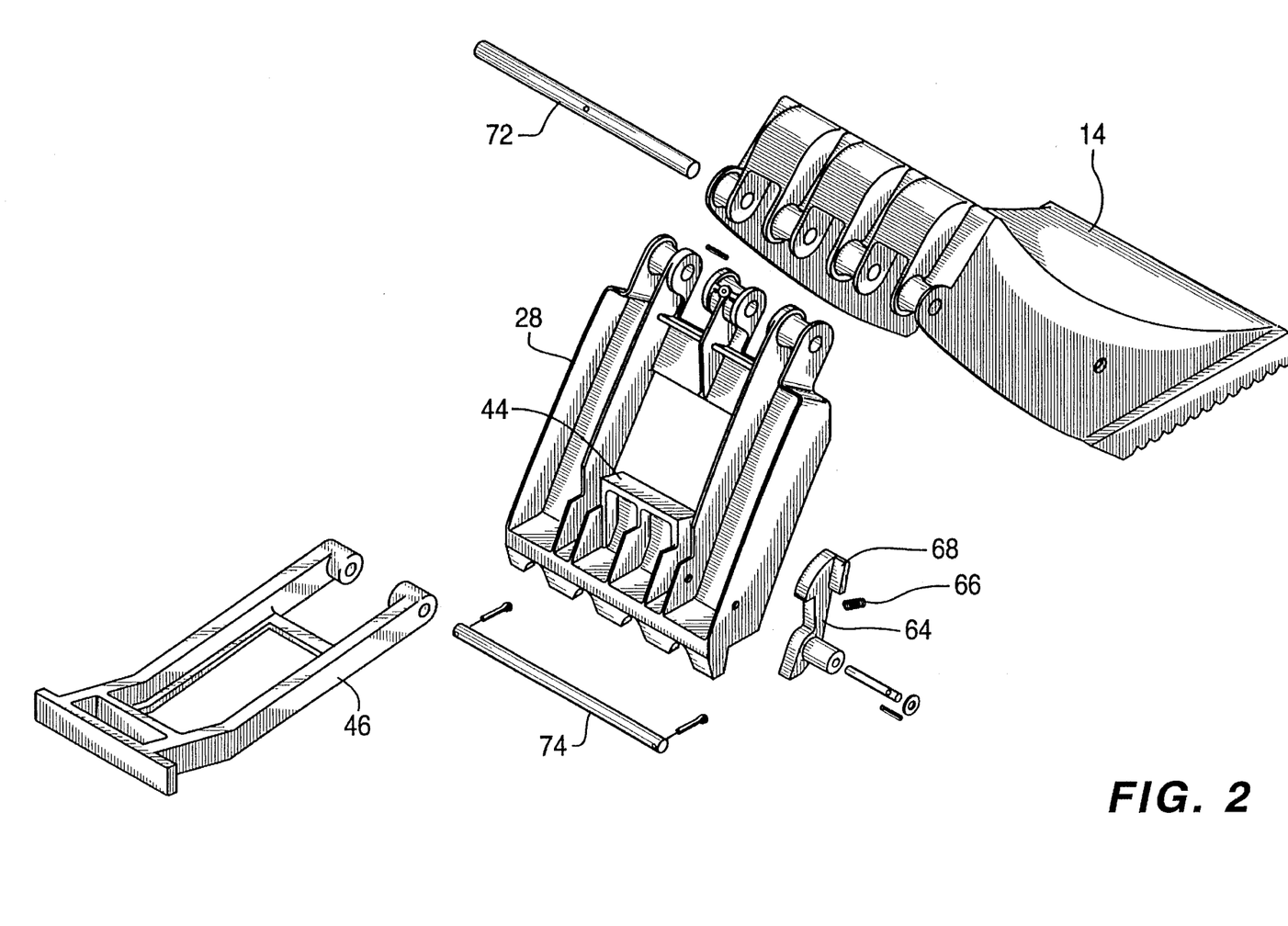
FIG. 2 is an exploded view of the collapsible wheel chock apparatus of the present invention.
Figure 3:
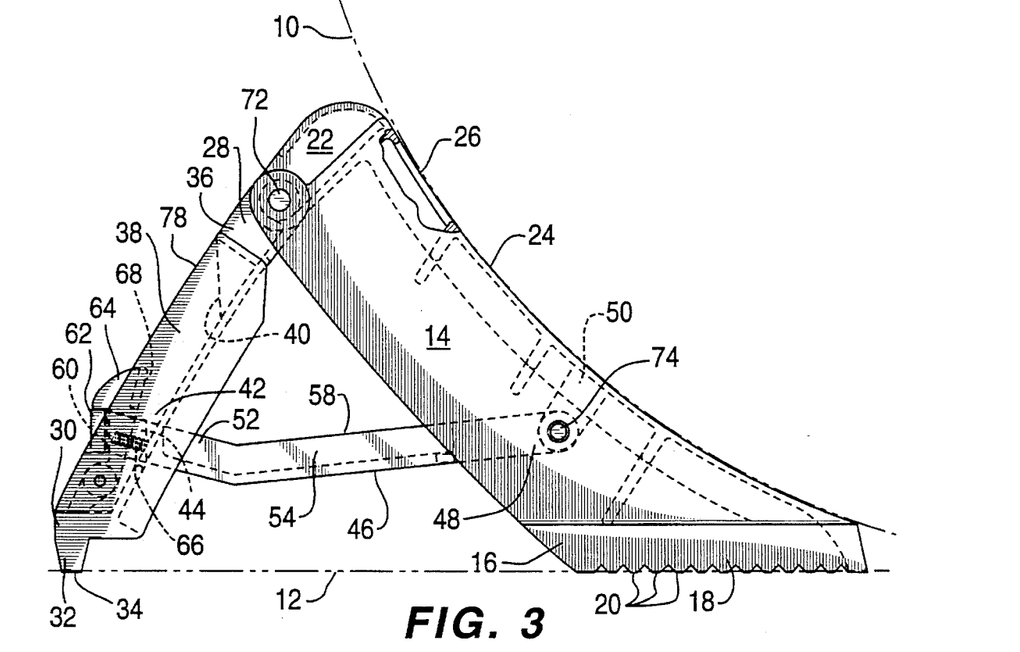
FIG. 3 is a side cross-sectional view of an embodiment of the collapsible wheel chock apparatus of the present invention shown in the raised position.
Figure 4:
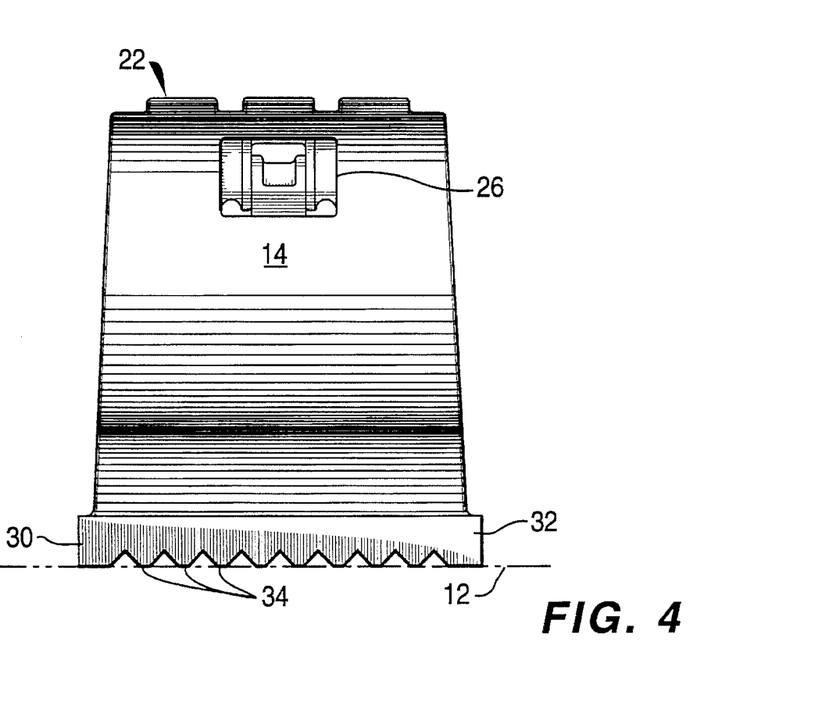
FIGS. 4 and 6 are respective rear views of the collapsible wheel chock apparatus of the present invention.
Figure 5:
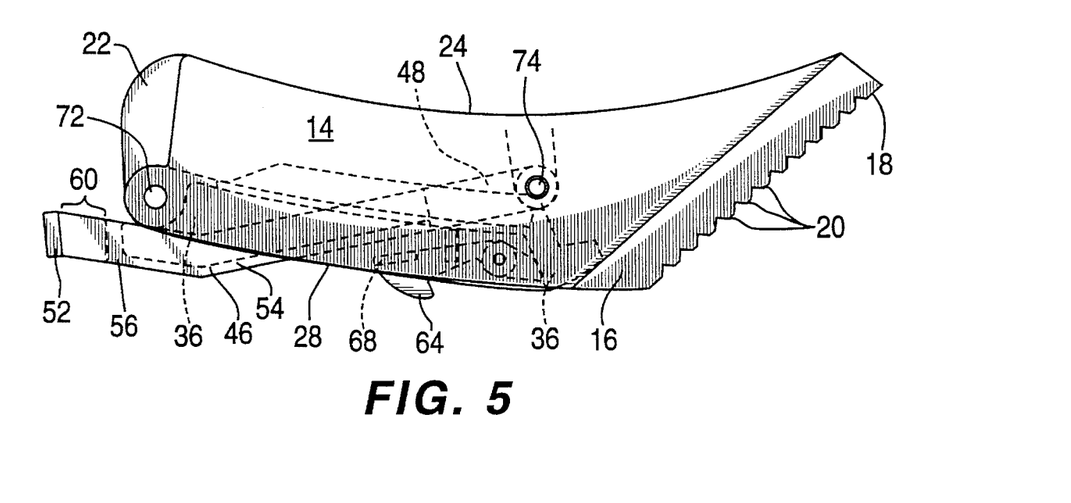
FIG. 5 is a side cross-sectional view an embodiment of the collapsible wheel chock apparatus of the present invention shown in the collapsed position.
Figure 6:
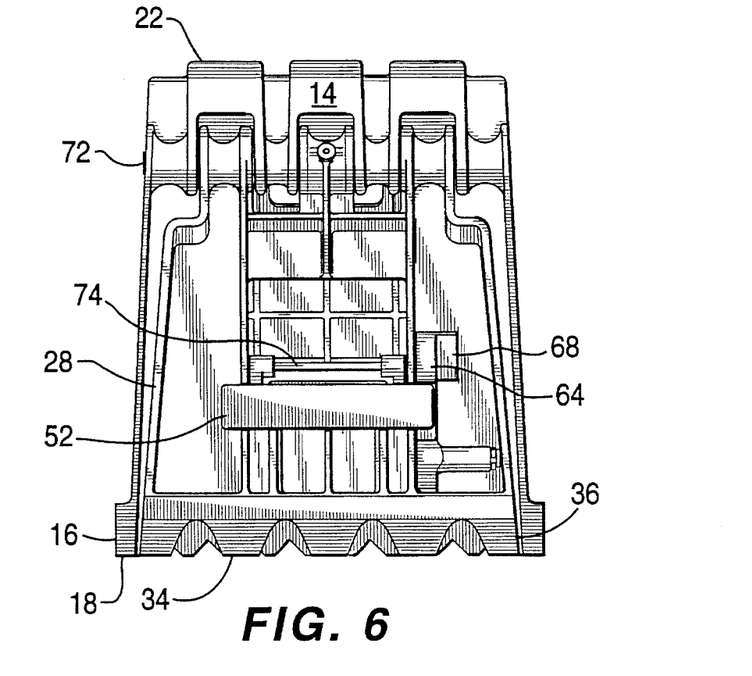
Figures 7, 8:
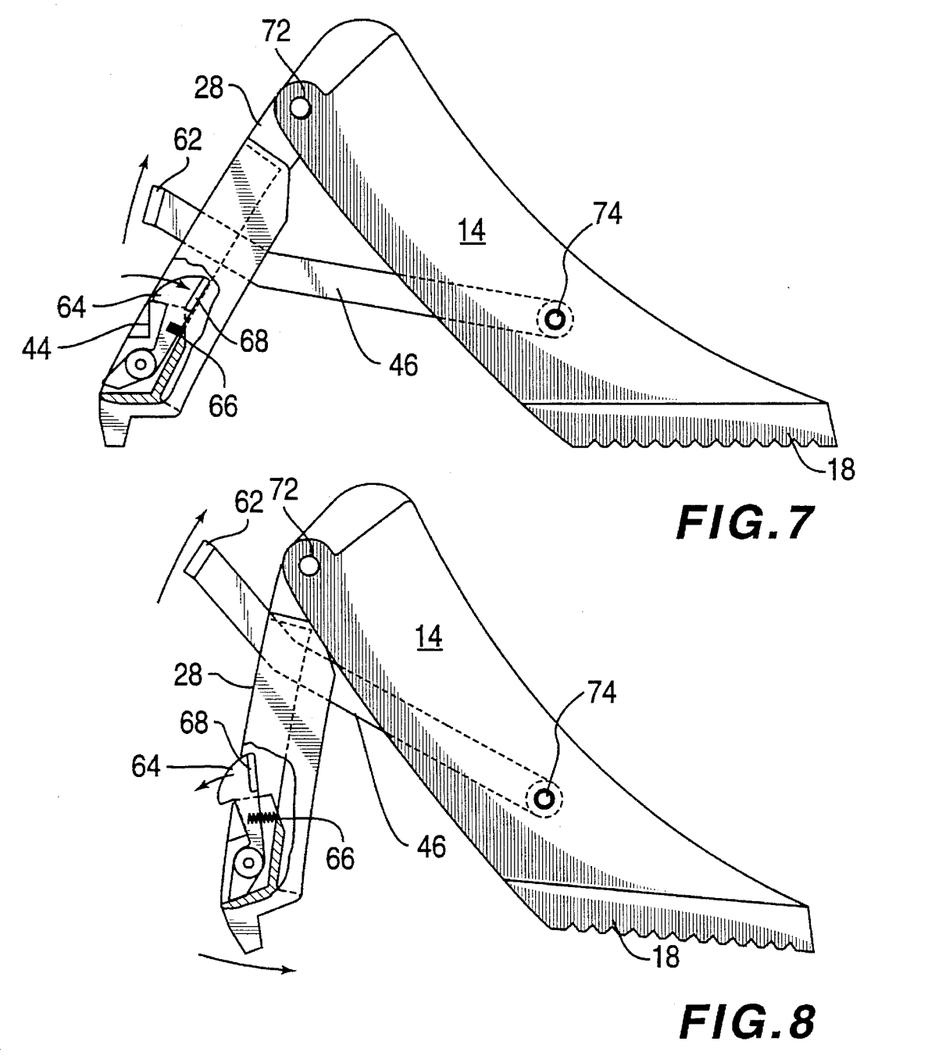
FIGS. 7–9 show consecutive steps involved in collapsing the wheel chock of the present invention.
Figure 9:
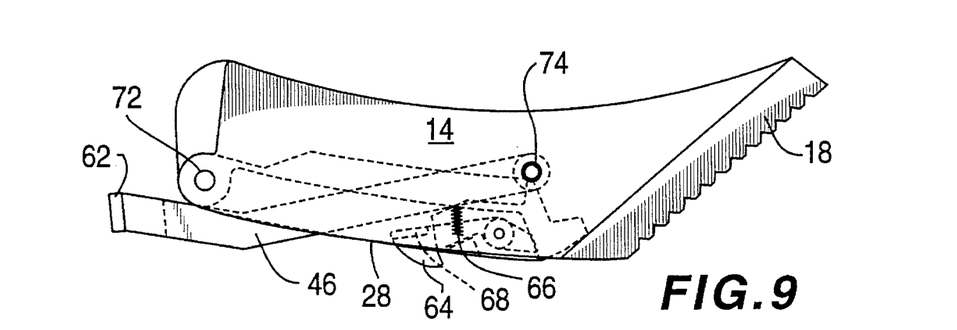

The present invention provides a collapsible wheel chock apparatus which is designed to be placed upon a vehicle support surface 12 such as a roadway, pavement, driveway, earth, grass or any other flat surface in wedging engagement between a vehicle wheel 10 and the support surface 12. The configuration of the wheel chock apparatus of the present invention includes a main body member 14 which is preferably angularly oriented with respect to the surrounding surface 12 and defines a wheel engagement surface 24 extending upwardly therealong which is preferably concave to facilitate abutment with respect to a vehicle wheel 10 in abutment thereagainst.

The wheel chock apparatus of the present invention further includes a first main body end means 16 preferably at the lowermost end of main body member 14 and a second main body end means 22 preferably at the uppermost end of the main body member 14. The first main body end 16 preferably includes a primary surface gripping means 18 such as a plurality of primary engagement teeth 20 as shown in the figures herein. These engagement teeth 20 are adapted to facilitate engagement with the wheel support surface 12 by the main body member 14 to aid in holding of the collapsible wheel chock apparatus of the present invention in the raised position in full engagement with the supporting environmental surface.

In the preferred embodiment shown herein a handle opening 26 is preferably defined in the main body member 14. The handle opening 26 is preferably defined in the upper portion of the concave wheel engagement surface 24. Opening 26 facilitates moving or handling of the collapsible wheel chock apparatus when in the raised position in order to aid in placement and handling thereof.

The present invention further includes a swing arm member 28 which is pivotally secured with respect to the main body member 14. Swing arm member 28 preferably includes a first swing arm end 30 and a second swing arm end 36. The second swing arm end 36 is pivotally secured with respect to the main body member 14. This pivotal securement can include a first roll pin member 72 to facilitate the pivotally movable interconnected securement. The first swing arm end 30 includes a secondary surface gripping means 32 such as a plurality of secondary engagement teeth 34. This surface gripping means 32 and the engagement teeth 34 thereof are adapted to firmly engage the wheel support surface 12 such that the swing arm member 28 when in the raised position firmly engages the surrounding environmental area.

With these two members configured angularly with respect to one another through the pivotal connection achieved by the first roll pin member 72 the wheel support surface 12 will be engaged by the first main body end 16 through the engagement teeth 20 located thereon and by the swing arm member 28 through the first swing arm end 30 and the secondary engagement teeth 34 located thereon.

A cross bar member 46 is preferably secured to the main body member 14 such as to be pivotally movable with respect thereto. This pivotal movement can be achieved by the use of a second roll pin member 74 which is pivotally secured with respect to both the main body member 14 and the cross bar member 46. Preferably the point of securement with respect to main body member 14 will be at an intermediate location 50 thereon.

The cross bar member 46 will include a first cross bar end 48 which is connected to the main body member 14 at the intermediate position 50 thereon. The cross bar member 46 will also include a second cross bar end means 52 which is movably secured with respect to the swing arm member 28.

Swing arm member 28 will preferably include a locking slot means 38 defined therein. This locking slot means 38 will include a first locking slot end 40 normally positioned in the uppermost portion of the locking slot 38 as well as a second locking slot end means 42 which is positioned preferably in the lowermost portion of the locking slot 38. The configuration of the cross bar 46 includes a central cross bar strut means 54 which extends from the first cross bar end 48 to the second cross bar end 52 for interconnecting therebetween. This central cross bar strut means 54 is adapted to extend through the locking slot 38. A shoulder means 62 is preferably integrally formed adjacent the second cross bar end 52 of the cross bar member 46 in such a manner as to entrap the central cross bar strut 54 in position extending through the locking slot 38. Removal of the cross bar member 46 and in particular the central cross bar strut 54 from the locking slot 38 is not possible due to the fact that the lateral dimension of the shoulder means 62 is greater than the lateral dimension of the locking slot 38. Thus, in this configuration, the central cross bar strut 54 will be movable within the locking slot 38 between the first locking slot end 40 and the second locking slot end 42 but will be captured therein and not removable.

When the central cross bar strut 54 of the cross bar member 46 is moved upwardly adjacent the first locking slot end 40 of the locking slot 38 the collapsible wheel chock apparatus of the present invention will be capable of being moved to the collapsed position 56. On the other hand when the central cross bar strut means 54 of the cross bar member 46 is moved preferably downwardly adjacent to the second locking slot end 42 of locking slot 38 then the apparatus of the present invention will be in the raised position 58. To facilitate holding of the central cross bar strut 54 in the raised position 58 adjacent the second cross bar end 52 of the locking slot 38 a locking tab 44 will be defined on the swing arm member 28. A complementary tab engagement opening 60 will be defined in the cross bar member 46 adjacent the second cross bar end 52 thereof. This tab engagement opening 60 will be of such a size as to be adapted to receive the locking tab means 44 extending therein to facilitate securement of the cross bar member 46 in position adjacent to the second locking slot end 42 for locking of the collapsible wheel chock apparatus of the present invention in the raised position 58.

Further securement of the cross bar member 46 in position extending through the locking slot 38 adjacent to the second locking slot end 42 thereof can be achieved by the inclusion in the apparatus of the present invention of a disengageable locking mechanism 64 which can include a spring biasing means 66 which will lock the locking tab 44 in position in the locking tab opening 60. Release of the spring biasing means 66 can be achieved by the inclusion of a release tab 68 which allows removal of the locking tab 44 from the tab engagement opening 60 to allow movement of the collapsible wheel chock apparatus of the present invention from the locked and raised position to the collapsible position.

The swing arm member 28 can assume a generally convex outer surface 70 in order to facilitate the stability of the overall triangular design of the apparatus. This triangular design is mainly achieved by the triangle formed by the main body member 14 extending obliquely upwardly and the swing arm member 28 extending obliquely downwardly therefrom and the cross bar member 46 extending approximately horizontally. This triangular configuration provides a strong and sturdy apparatus which can be used with the larger types of emergency vehicles utilized in emergency situations now.

It should be appreciated that the apparatus of the present invention provides this novel interlocking configuration which includes the capturing of the shoulder 62 of the cross bar member 46 within the locking slot 38 defined in the swing arm member 28. This arrangement facilitates firm securement by operation of the disengageable locking mechanism 64 and selective operation of the spring biasing means 66 or the release tab 68. This configuration, however, simultaneously allows for collapsing of the design to a height in the collapsed position of as little as 50% of the height of the unit when in the raised position. Prototypes have shown that the height of the unit can be approximately twelve inches when in the raised position 58 and when moved to the collapsed position 56 the height can be reduced to as little as six inches. This is a significant savings in storage capacity which is of significant importance to emergency vehicles which have great demands on their storage capacities.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A collapsible wheel chock apparatus positioned upon a vehicle support surface in abutment against a vehicle wheel for restricting movement thereof, said collapsible wheel chock apparatus comprising:

A. a main body member adapted to be positioned upon a vehicle support surface in abutment with a vehicle wheel for restricting movement thereof, said main body member including;
  (1) a first main body end means adapted to be positioned in abutment with a vehicle support surface for supporting of said collapsible wheel chock apparatus;
  (2) a second main body end means spatially disposed along said main body member from said first main body end means and extending outwardly therefrom;
  (3) a wheel engagement surface positioned on said main body member between said first main body end means and said second main body end means for abutment against a vehicle wheel for restricting movement thereof;

B. a swing arm member pivotally secured to said second main body end means of said main body member, said swing arm member including:
  (1) a first swing arm end means adapted to directly engage the adjacent ground surface to facilitate support of said collapsible wheel chock apparatus between a vehicle support surface and a vehicle wheel;
  (2) a second swing arm end means spatially disposed from said first swing arm end means along said swing arm member and pivotally secured with respect to said second main body end means of said main body member;
  (3) said swing arm member defining a locking slot means therein having a first locking slot end means and a second locking slot end means;

C. a cross bar member pivotally secured with respect to said main body member and movably secured with respect to said swing arm member extending through said locking slot means of said swing arm member, said cross bar member including:

(1) a first cross bar end means pivotally secured with respect to said main body member;

(2) a second cross bar end means spatially disposed from said first cross bar end means on said cross bar member and movably secured with respect to said swing arm member; and (3) a central cross bar strut means extending from said first cross bar end means through said locking slot means to said second cross bar end means, said central cross bar strut means of said cross bar member being moveable within said locking slot means between a collapsed position adjacent said first locking slot end means and a raised position adjacent said second locking slot end means, said central cross bar strut means being selectively engageable with respect to said swing arm member adjacent said second locking slot end means for selectively locking thereof in the raised position.

2. A collapsible wheel chock apparatus positioned upon a vehicle support surface in abutment against a vehicle wheel for restricting movement thereof as defined in claim 1 wherein said swing arm member includes a locking tab means extending into said locking slot means adjacent said second locking slot end means, said locking tab means adapted to engage said central cross bar strut means of said cross bar member for selectively retaining thereof adjacent said second locking slot end means for retaining thereof in the raised position to facilitate engaging of a vehicle wheel by said wheel engagement surface of said main body member.

3. A collapsible wheel chock apparatus positioned upon a vehicle support surface in abutment against a vehicle wheel for restricting movement thereof as defined in claim 2 wherein said central cross bar strut means defines a tab engagement opening adapted to receive said locking tab means extending therein to facilitate selective retaining of said central cross bar strut means and said cross bar member in the raised position to facilitate engaging of a vehicle wheel by said wheel engagement surface of said main body member.

4. A collapsible wheel chock apparatus positioned upon a vehicle support surface in abutment against a vehicle wheel for restricting movement thereof as defined in claim 1 further comprising a disengageable locking mechanism for selectively retaining of said central cross bar strut means and said cross bar member in the raised position to facilitate engagement of a vehicle wheel by said wheel engagement surface of said main body member, 5. A collapsible wheel chock apparatus positioned upon a vehicle support surface in abutment against a vehicle wheel for restricting movement thereof as defined in claim 4 wherein said disengageable locking mechanism is resiliently biased into a position of engaging said cross bar member with respect to said swing arm member.

6. A collapsible wheel chock apparatus positioned upon a vehicle support surface in abutment against a vehicle wheel for restricting movement thereof as defined in claim 5 wherein said disengageable locking mechanism includes a spring biasing means for retaining engagement of said swing arm member with respect to said cross bar member.

7. A collapsible wheel chock apparatus positioned upon a vehicle support surface in abutment against a vehicle wheel for restricting movement thereof as defined in claim 6 wherein said disengageable locking mechanism includes a release tab to facilitate disengagement of said locking mechanism to allow for moveable engagement between said cross bar member and said swing arm member.

8. A collapsible wheel chock apparatus positioned upon a vehicle support surface in abutment against a vehicle wheel for restricting movement thereof as defined in claim 1 wherein said cross bar member includes a shoulder means fixedly secured adjacent said second cross bar end means and extending laterally outwardly thereof to movably retain said cross bar member extending through said locking slot means defined in said swing arm member.

9. A collapsible wheel chock apparatus positioned upon a vehicle support surface in abutment against a vehicle wheel for restricting movement thereof as defined in claim 1 wherein said first main body end means of said main body member includes a primary surface gripping means defined thereon to facilitate engagement with the vehicle support surface in abutment therewith.

10. A collapsible wheel chock apparatus positioned upon a vehicle support surface in abutment against a vehicle wheel for restricting movement thereof as defined in claim 9 wherein said primary gripping surface means includes a primary teeth engagement means to facilitate gripping of the vehicle support surface in abutment therewith.

11. A collapsible wheel chock apparatus positioned upon a vehicle support surface in abutment against a vehicle wheel for restricting movement thereof as defined in claim 1 wherein said first swing arm end means of said swing arm member includes a secondary surface gripping means defined thereon to facilitate engagement with the vehicle support surface in abutment therewith.

12. A collapsible wheel chock apparatus positioned upon a vehicle support surface in abutment against a vehicle wheel for restricting movement thereof as defined in claim 11 wherein said secondary gripping surface means includes a secondary teeth engagement means to facilitate gripping of the vehicle support surface in abutment therewith.

13. A collapsible wheel chock apparatus positioned upon a vehicle support surface in abutment against a vehicle wheel for restricting movement thereof as defined in claim 1 wherein said first cross bar end means is pivotally secured with respect to said main body member at an intermediate position thereon spatially disposed from and between said first main body end means and said second main body end means.

14. A collapsible wheel chock apparatus positioned upon a vehicle support surface in abutment against a vehicle wheel for restricting movement thereof as defined in claim 1 wherein said wheel engagement surface is concave.

15. A collapsible wheel chock apparatus positioned upon a vehicle support surface in abutment against a vehicle wheel for restricting movement thereof as defined in claim 1 further comprising a first roll pin member rotatably mounted to said first main body end means of said main body member and rotatably mounted to said first swing arm end means of said swing arm member to facilitate pivotal movement therebetween.

16. A collapsible wheel chock apparatus positioned upon a vehicle support surface in abutment against a vehicle wheel for restricting movement thereof as defined in claim 1 further comprising a second roll pin member rotatably mounted to said first cross bar end means and rotatably mounted to said main body member to facilitate pivotal movement therebetween.

17. A collapsible wheel chock apparatus positioned upon a vehicle support surface in abutment against a vehicle wheel for restricting movement thereof as defined in claim 1 wherein said swing arm member is convex.

18. A collapsible wheel chock apparatus positioned upon a vehicle support surface in abutment against a vehicle wheel for restricting movement thereof as defined in claim 1 wherein said swing arm member is pivotable with respect to said main body member to a collapsed position thereagainst with said second main body end means immediately adjacent thereto responsive to said central cross bar strut means being in the collapsed position adjacent said first locking slot end means.

19. A collapsible wheel chock apparatus positioned upon a vehicle support surface in abutment against a vehicle wheel for restricting movement thereof as defined in claim 1 wherein said main body member defines a handle opening herein to facilitate handling of said collapsible wheel chock apparatus.

20. A collapsible wheel chock apparatus positioned upon a vehicle support surface in abutment against a vehicle wheel for restricting movement thereof, said collapsible wheel chock apparatus comprising:

A. a main body member adapted to be positioned upon a vehicle support surface in abutment with a vehicle wheel for restricting movement thereof, said main body member including;
  (1) a first main body end means adapted to be positioned in abutment with a vehicle support surface for supporting of said collapsible wheel chock apparatus, said first main body end means including a primary surface gripping means defined thereon to facilitate engagement with the vehicle support surface in abutment therewith, said primary surface gripping means including primary engagement teeth thereon;
  (2) a second main body end means spatially disposed along said main body member from said first main body end means and extending outwardly therefrom;
  (3) a wheel engagement surface positioned on said main body member between said first main body end means and said second main body end means for abutment against a vehicle wheel for restricting movement thereof, said wheel engagement surface being concave;
  (4) said main body member defining a handle opening herein to facilitate handling of said collapsible wheel chock apparatus;

B. a swing arm member pivotally secured to said second main body end means of said main body member, said swing arm member including:
  (1) a first swing arm end means adapted to directly engage the adjacent ground surface to facilitate support of said collapsible wheel chock apparatus between a vehicle support surface and a vehicle wheel, said first swing arm end means including a secondary surface gripping means defined thereon to facilitate engagement with the vehicle support surface in abutment therewith, said secondary surface gripping means including secondary engagement teeth thereon;
  (2) a second swing arm end means spatially disposed from said first swing arm end means along said swing arm member and pivotally secured with respect to said second main body end means of said main body member;
  (3) said swing arm member defining a locking slot means therein having a first locking slot end means and a second locking slot end means;
  (4) a locking tab means extending into said locking slot means adjacent said second locking slot end means;

C. a cross bar member pivotally secured with respect to said main body member and movably secured with respect to said swing arm member extending through said locking slot means of said swing arm member, said cross bar member including:
  (1) a first cross bar end means pivotally secured with respect to said main body member at an intermediate position thereon spatially disposed from and between said first main body end means and said second main body end means;
  (2) a second cross bar end means spatially disposed from said first cross bar end means on said cross bar member and movably secured with respect to said swing arm member;
  (3) a central cross bar strut means extending from said first cross bar end means through said locking slot means to said second cross bar end means, said central cross bar strut means of said cross bar member being moveable within said locking slot means between a collapsed position adjacent said first locking slot end means and a raised position adjacent said second locking slot end means, said central cross bar strut means being selectively engageable with respect to said swing arm member adjacent said second locking slot end means for selectively locking thereof in the raised position, said central cross bar strut means defining a tab engagement opening adapted to receive said locking tab means extending therein for detachable securing of said cross bar member with respect to said swing arm member to facilitate selective retaining of said central cross bar strut means and said cross bar member in the raised position to facilitate engaging of a vehicle wheel by said wheel engagement surface of said main body member;
  (4) a shoulder means positioned adjacent said second cross bar end means and extending laterally outwardly thereof to movably retain said cross bar member extending through said locking slot means defined in said swing arm member and allow movement of said cross bar member within said locking slot means; and D. a disengageable locking mechanism for selectively retaining of said central cross bar strut means and said cross bar member in the raised position to facilitate engagement of a vehicle wheel by said wheel engagement surface of said main body member, said disengageable locking mechanism being resiliently biased into a position of engaging said cross bar member with respect to said swing arm member, said disengageable locking mechanism including a spring biasing means for retaining engagement of said swing arm member with respect to said cross bar member, said disengageable locking mechanism further including a release tab to facilitate disengagement of said locking mechanism to allow for moveable engagement between said cross bar member and said swing arm member, said swing arm member being pivotable with respect to said main body member to a collapsed position thereagainst with said second main body end means immediately adjacent thereto responsive to said central cross bar strut means being in the collapsed position adjacent said first locking slot end means.

* * * * *